US008401567B2

(12) United States Patent
Aubert et al.

(10) Patent No.: US 8,401,567 B2
(45) Date of Patent: Mar. 19, 2013

(54) METHOD AND SYSTEM TO LOCATE AN OBJECT

(75) Inventors: Denis Aubert, St. Paul de Vence (FR); Joaquin Picon, St. Laurent du Var (FR); Pierre Secondo, Tourrettes sur Loup (FR); Joel Viale, Les Collines Vence (FR)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 12/640,370

(22) Filed: Dec. 17, 2009

(65) Prior Publication Data

US 2010/0159953 A1    Jun. 24, 2010

(30) Foreign Application Priority Data

Dec. 19, 2008 (EP) .................................... 08305986

(51) Int. Cl.
    *H04W 24/00*    (2009.01)
(52) U.S. Cl. ................. 455/456.2; 455/343.1; 455/574; 455/41.2; 455/550.1
(58) Field of Classification Search .............. 340/10.1, 340/10.4–10.52; 455/41.1–41.3, 426.1, 456.1–457, 455/556.1, 550.1, 41.2, 574, 343.1, 127.5
    See application file for complete search history.

(56) References Cited

U.S. PATENT DOCUMENTS

| | | | |
|---|---|---|---|
| 5,790,946 A * | 8/1998 | Rotzoll ....................... 455/343.1 |
| 5,963,134 A * | 10/1999 | Bowers et al. ............. 340/572.1 |
| 6,037,879 A * | 3/2000 | Tuttle ........................... 340/10.4 |
| 6,177,860 B1 * | 1/2001 | Cromer et al. ................ 340/10.1 |
| 6,211,799 B1 * | 4/2001 | Post et al. ....................... 341/33 |
| 6,525,648 B1 * | 2/2003 | Kubler et al. ............... 340/10.33 |
| 6,901,260 B1 * | 5/2005 | Xin .............................. 455/456.1 |
| 6,978,118 B2 | 12/2005 | Vesikivi et al. |
| 7,499,985 B2 * | 3/2009 | Linjama et al. ............... 709/220 |
| 7,663,502 B2 * | 2/2010 | Breed ......................... 340/12.25 |
| 8,005,426 B2 * | 8/2011 | Huomo et al. ............... 455/41.2 |
| 8,135,415 B2 * | 3/2012 | Malik et al. ................ 455/456.1 |
| RE43,430 E * | 5/2012 | Domnitz ....................... 455/461 |
| 2007/0066278 A1 | 3/2007 | Hong |
| 2007/0090958 A1 * | 4/2007 | Stilp .......................... 340/572.8 |
| 2007/0197261 A1 * | 8/2007 | Humbel ....................... 455/558 |
| 2007/0229270 A1 | 10/2007 | Rofougaran |
| 2008/0018467 A1 | 1/2008 | Estevez |
| 2008/0026735 A1 * | 1/2008 | Lee ............................ 455/414.3 |
| 2008/0064413 A1 * | 3/2008 | Breed ......................... 455/456.1 |
| 2009/0224892 A1 * | 9/2009 | Nicholls ..................... 340/10.42 |
| 2012/0053472 A1 * | 3/2012 | Tran .............................. 600/509 |

* cited by examiner

*Primary Examiner* — Sharad Rampuria
(74) *Attorney, Agent, or Firm* — Andrea Bauer; Hoffman Warnick LLC

(57) ABSTRACT

A computer-implemented method, system, and computer program product for handling identification information emitted by a radio frequency device, and a radio frequency device for emitting identification information. The method receives and stores identification information transmitted by the radio frequency device, retrieves the identification information from the first mobile communication device, and inserts the identification information into the communication. The system includes a first mobile communication device, a second communication device, and an inserting means. The computer program product includes computer program instructions for carrying out the steps of the method. The radio frequency device includes an antenna adapted to operate in UHF frequency bands, an energy storage means adapted to be charged with energy captured through the antenna, an information storage means adapted to store information, and a transmission means adapted to transmit the information using the energy from the energy storage means.

14 Claims, 9 Drawing Sheets

METHOD AND SYSTEM TO LOCATE AN OBJECT

CROSS-REFERENCE TO RELATED APPLICATIONS

This application claims priority under 35 U.S.C.§119 to European Patent Application No. 08305986.5 filed Dec. 19, 2008, the entire contents of which are incorporated by reference herein.

BACKGROUND OF THE INVENTION

1. Field of the Invention

The present invention relates generally to mobile communications, and more particularly to systems and methods to locate objects by using mobile devices powering radio frequency devices.

2. Description of the Related Art

Many systems exist to identify and localize objects. In particular, several solutions have been developed to localize stolen or lost objects.

The existing solutions present several drawbacks. An efficient localization system would require solving several cumulative problems (energy, sensors, communication, and location): finding first the required energy for powering a tracking device apposed on an object, having a sufficient number of detectors of the tracking device, having efficient communication means, solving the determination of the location of the detected tracked device.

Relating to the "energy" problem, many solutions require a source of energy such as a battery (in Argos' buoys or PIEPS/ARVAs avalanche transceivers for example); it is also not convenient for small objects. Some others, which do not require a source of energy, do not enable a remote detection (engraved identifiers on cars) and do not enable a localization of goods.

Relating to the "sensors" problem, difficulties arise, as to how to implement a sufficient number of captors or sensors. Military forces sometimes send a huge number of sensors on battlefields to be able to detect targets. The objects to be located can be fixed in space or can be in movement. In this last case, the use of fixed detection devices can be imagined: when the object to be detected passes nearby a detection device whose location is known then the localization problem is solved, but this solution presents many drawbacks (costs, tracking, etc).

Regarding the "communication" problem, it is required to setup a complete communication infrastructure. Questions arise as to costs, technology and integration with the sensors for example. At last, when choices have been made about the previous aspects, a question arises as to the determination of the location.

In order to solve the primary energy problem, the prior art sometimes show the use of (passive) RFID tags. The existing solutions almost always require the use of RFID readers.

For example, patent document U.S. Pat. No. 6,978,118, entitled "Apparatus, system, method and computer program product for implementing an automatic identification system with a personal communication device to improve functionality of a personal communication device," discloses a data carrier that contains one or more data items and which transmits a data signal wirelessly to a personal communication device equipped with an RFID reader. The personal communication device decodes the data signal and at least a portion of the data is used by the personal communication device to establish a communication connection with another device or network. The data subsequently transmitted by the personal communication device is accomplished using GSM, GPRS, WAP, EDGE, UMTS or other similar wireless network protocol. The communication connection is used to provide a request for a service such as a phone call, an Internet connection, a third party service, or to request for the storage of data in a network.

This document thus discloses a system and method using a communication device equipped with an RFID reader. This solution is not convenient since the RFID reader would consume a lot of the (limited) energy available in the mobile communication device: in order to detect passive tags (the mobile phone being in standby or in communication mode), the reader must be active (in operative mode) all the time. The document does not address the other issues (energy, sensors, communication, and location).

Patent document US20070229270, entitled "RFID System with RF bus," discloses a radio frequency identification (RFID) system which includes an RFID reader, an RFID tag, and a network connection module. In the detailed description, and FIG. 2 is a schematic block diagram of an embodiment of an RFID (radio frequency identification) system 50 that includes a communication device, a computer, and/or a server 52, a plurality of RFID readers 54-58 and a plurality of RFID tags 60-70. The document discloses a system where the RFID readers 54-58 collect data as may be requested from the communication device.

This document thus discloses a system where RFID readers interact with communication devices. The problem posed by energy still remains. The solution is depending upon RFID readers are in active mode or not and the use of several devices is required.

Patent document US20070066278, entitled "Mobile communication terminal including RFID reader and transception method thereof," discloses a mobile communication terminal including a Radio Frequency Identification (RFID) reader, and more specifically having a shared antenna for RFID transception and wireless telecommunications transception.

This document once again does not solve the energy problem; it still requires embedding an RFID reader on the mobile communication device.

The patent document US20080018467, entitled "RFID Power from handset transmissions," discloses a radio frequency identification (RFID) tag which includes a transceiver and a component coupled to the transceiver. The transceiver is adapted to wirelessly receive power from an RFID reader and/or from a mobile communication device. The power received from the mobile communication device is used to power the component, providing an alternative power source (cellular beacons) that uses no additional handset power.

This document thus discloses an RFID tag which includes two components, one of which (e.g., a sensor) can be powered by the mobile communication device itself. More precisely, the document discloses a radio frequency identification (RFID) tag which includes a transceiver and a component coupled to the transceiver. The transceiver is adapted to wirelessly receive power (from an RFID reader and) from a mobile communication device. The power received from the mobile communication device is used to power the component. According to the description, the mobile communication device 40 preferably is not an RFID reader or RFID-compliant at all. In the detailed description, at paragraph [0014], the document discloses that "[t]he tag's receiver may be designed to operate in several modes . . . . (2) Operation as a cellular-mode receiver, in which energy is gathered from one or more of the standard cellular uplink frequencies. Beacons from the cellular handset may be used to prompt the RFID device to transmit its information . . . " This document thus proposes an interesting solution to the energy problem but it does not address the localization issue at all (as well as the communication and location problem).

Accordingly, there is a need for a method or system that enables the location of an object, where such method or system solves or overcomes the energy, sensors, communication, and localization issues.

SUMMARY OF THE INVENTION

According to an embodiment of the present invention, a method is provided for handling identification information emitted by a radio frequency device. The method includes: receiving and storing the identification information emitted by the radio frequency device, where a first mobile communication device is connected to a cellular network and the first mobile communication device receives and stores the transmitted identification information; retrieving the identification information from the mobile communication device where a second communication device capable of user initiated communications retrieves the identification information and the second communication device awaits the initiation by a user of a communication; and inserting the identification information in the communication.

According to another embodiment of the present invention, a computer program product for handling identification information emitted by a radio frequency device includes computer program instructions for carrying out the steps of the method According to yet another embodiment of the present invention, a radio frequency device includes: an antenna adapted to operate in UHF frequency bands; an energy storage means adapted to be charged with energy captured through the antenna; an information storage means adapted to store information; a transmission means adapted to transmit the information using energy from the energy storage means.

Further advantages of the present invention will become clear to the skilled person upon examination of the drawings and detailed description. It is intended that any additional advantages be incorporated therein.

DETAILED DESCRIPTION OF PREFERRED EMBODIMENTS

Figure 1:
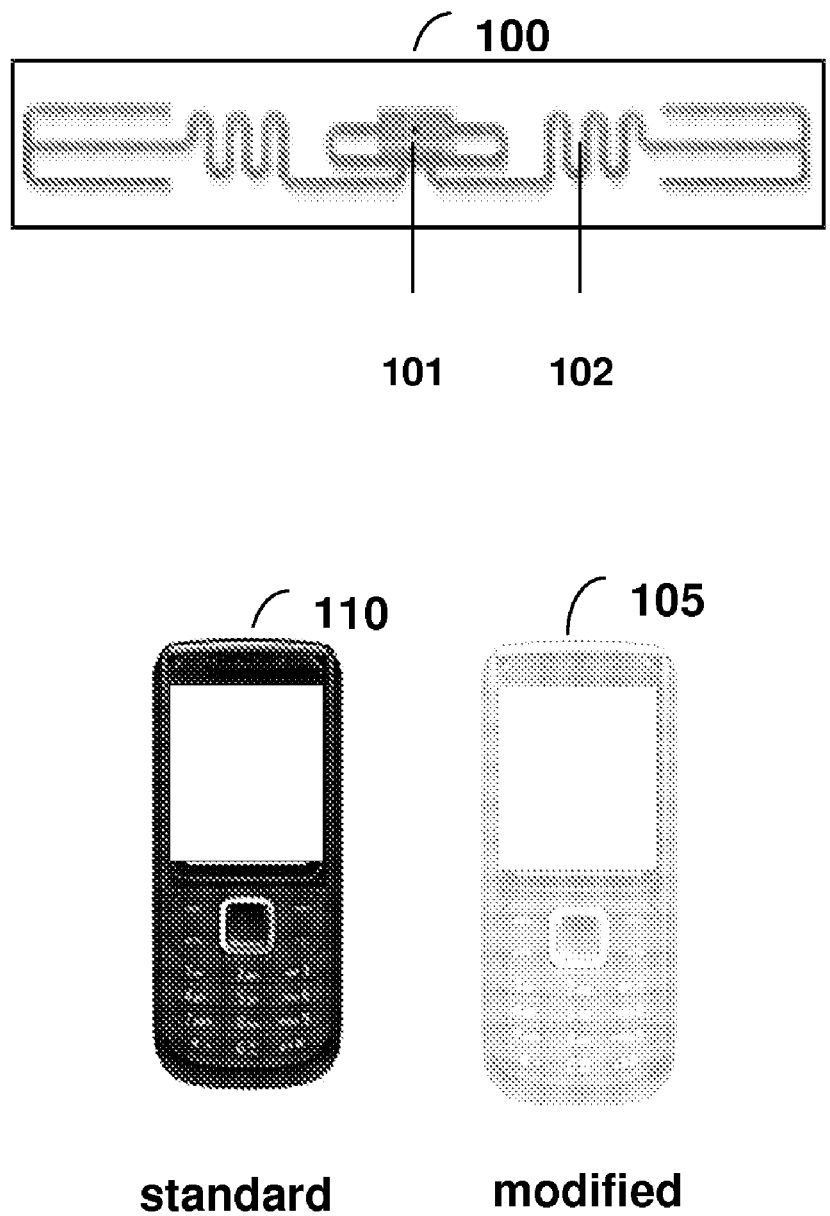
FIG. 1 details the objects used in embodiments of the present invention.

To facilitate the description, any numeral identifying an element in one figure will represent the same element in any other figure.

While the systems and methods are illustrated by use of mobile phone embodiments and applications, they are equally applicable to virtually any portable or mobile communication device, including for example, wireless laptop computers and PDAs. In the description, the acronym RFD is used for radio frequency device.

According to an embodiment of the present invention, a method for handling identification information emitted by a radio frequency device includes: receiving and storing the identification information emitted by the radio frequency device, where a first mobile communication device is connected to a cellular network and the first mobile communication device receives and stores the transmitted identification information; retrieving the identification information from the mobile communication device where a second communication device capable of user initiated communications retrieves the identification information and the second communication device awaits the initiation by a user of a communication; and inserting the identification information in the communication.

In a first development of the embodiment of the present invention, the method further includes the step of determining the location of the first mobile communication device with reference to the cellular network, and the location of the first mobile communication device is associated with the location of the radio frequency device.

Determining the location of the first mobile communication device can be performed with reference to location information of a base station associated with the first mobile communication device in the cellular network. Alternatively, the device can be performed with reference to time-stamped data associated with the identification information emitted by the radio frequency device.

In a second development of the embodiment of the present invention, the method includes inserting the identification information in the communication by means of DTMF encoding.

In a third development of the embodiment of the present invention, the first mobile communication device and/or the second communication device can be devices such as a cellular telephone (GSM or GPRS or WAP or EDGE or UMTS or 3G) or a wireless device (such as a wireless laptop computer or GPS or PDA).

In a fourth development of the embodiment of the present invention, the second communication device is a fixed device. The second device indeed can be immovable.

In a fifth development of the embodiment of the present invention, the first mobile communication device emits radiation at a first frequency, and the radio frequency device is adapted to be responsive at the first frequency.

In a sixth development of the embodiment of the present invention, the radio frequency device can wirelessly receive power from an external energy source other than the first mobile communication device.

In a seventh development of the embodiment of the present invention, the location of the first mobile communication device can be provided upon a query by a user.

In an eighth development of the embodiment of the present invention, the first mobile communication device and the second communication device can be the same device.

In a ninth development of the embodiment of the present invention, a further mobile communication device transmits energy to the radio frequency device by means of electromagnetic radiation and, in response to the further mobile communication device transmitting the energy, the radio frequency device transmits the identification information.

There can be one unique communication device capturing and transmitting the information of the radio frequency device (and leading to its localization). The method can also be performed in two-steps: in a first step, the information is captured and in a second step the information is transmitted by another device; the other device being more capable, acting like a parasite or leveraging, profiting of, taking advantage of, enjoy, exploiting communication opportunities or channels.

A method and system is provided where modified mobile phones are used as a direct source of energy for powering a radio frequency device apposed on an object to be tracked or detected. The radio frequency device which is powered by a mobile phone present in a few meters range does not require other sources of energy, such as delivered by an RFID reader. The information received from the tracked object and captured by a mobile phone in the vicinity is transmitted (using an open voice connection) to the network operator network, which can make this information available to interested parties. The identification of the base station where the call was made from (which equals its approximate geographical location) or the extraction of GPS information of the mobile phone itself enables the localization of the tracked device.

According to other embodiments, the present invention is composed of (1) a specific tag which answers passively to the energy permanently emitted by (2) one or a plurality of mobile phones modified to be able to receive information form the tag; the mobile phone inserting (3) the information in a further audio or voice communication. And in the end, the information being analyzed by a third party, which associates the localization of the mobile phone with the specific tag, stores and restitutes the resulting data.

According to other embodiments of the present invention, a method is provided for localizing items (like vehicles, vending machines, luggage's etc) fixed with specific tags using GSM telephones, including the steps of defining an RFID tag that can be powered by a GSM phone when the phone is emitting close to the tag, thus powering the RFID tag and make it start emitting its ID; modifying the phone to be able to receive the message emitted by GSM RFID tag, code the message in DTMF and pass it "in band" on the channel carrying the phone conversation; a GSM service provider capturing the DTMF message and making the association between the GSM ID tag, the mobile phone number, time and location. The information is made available to the user querying about the item with the tagged ID, to localize them.

Usually radio frequency devices transmit their ID when interrogated by RFID readers. Readers can be fixed and installed in specific locations like dock doors or they can be mobile like PDA equipped with an embedded RFID reader. In both cases, the readers or the tags locations are predefined. According to embodiments of the present invention, the radio frequency device is anywhere and it is not known a priori which reader is going to read it.

According to other embodiments of the present invention, a method involving a plurality of communication devices is provided, where the devices are mobile (in movement) or fixed. A first device powers the tag, a second device receives the ID information; a third device uploads the ID information in the network for a further use by a third party; a fourth device queries a party in the network for locating or ID information. In one situation according to certain embodiments of the present invention, the first and the second device can be the same device. In another situation according to other embodiments of the present invention, the second and the third device can be the same device. In yet another situation according to other embodiments of the present invention, the first and the third device can be the same device. The same conclusion and multiple combinations appear for the fourth device and generally speaking for a device numbered n.

According to another embodiment of the present invention, a computer program product for handling identification information emitted by a radio frequency device includes computer program instructions for carrying out the steps of the method According to yet another embodiment of the present invention, a radio frequency device includes: an antenna adapted to operate in UHF frequency bands; an energy storage means adapted to be charged with energy captured through the antenna; an information storage means adapted to store information; a transmission means adapted to transmit the information using energy from the energy storage means.

The antenna can be adapted to mobile phone frequency bands, such as GSM 1800 (1805-1880 MHz) or UMTS (2110-2170 MHz) or GSM 900 (925-960 MHz) bands. An Ultra High Frequency (UHF) front-end block can be adapted to work in the mobile phone frequency bands. The radio frequency device can further include a control logic block can be in the form of a finite state machine. The radio frequency device can be adapted to emit the information when the energy stored in the energy means equals a predetermined level of energy. The radio frequency device can further include a logical means adapted to control the transmission of the information at predetermined intervals.

Referring to FIG. 1, details are shown of the objects used in the embodiments of the present invention which includes a radio frequency device 100, a (standard) mobile communication device 110 and a (modified) mobile communication device 105.

The radio frequency device 100 is a tag which is much simpler than a classical RFID tag. It does not need to communicate with a RFID tag reader consequently. Additionally, it does not have many of the functions required in a classical RFID tag, such as the required logic to understand and execute the various standard commands from a tag reader and answer to them via protocol which can be complex, like the anti-collision/singulation protocols. Unlike a standard RFID tag, which receives its energy and commands from a reader, this tag only receives energy from the GSM communications from one or several telephones; however, it does not engage in dialog with them. Instead, it just captures a fraction of the energy they emit. Subsequently, using the captured energy, the GSM tag emits its ID that a telephone set (not necessarily the one that has fed the tag), equipped with the proper equipment can receive.

The radio frequency device 100 "acts" as a passive RFID tag, which does not emit any information unless it is powered by an external source. The radio frequency device 100 includes a chip 101 and an antenna 102. A tag is an object that can be applied to or incorporated into an object, animal, or person for the purpose of identification and tracking using radio waves. Some tags can be read from several meters away and beyond the line of sight of the reader. Most radio frequency devices contain at least two parts. One is an integrated circuit (such as 101) for storing and processing information, modulating and demodulating a radio-frequency (RF) signal, and other specialized functions. The second is an antenna (such as 102) for receiving and transmitting the signal. There are generally two types of RFID tags: active RFID tags, which contain a battery, and passive RFID tags, which have no battery. Passive tags require no internal power source (they are only active when a reader is nearby to power them by wireless illumination). Passive tags have practical read distances ranging from about 11 cm (4 in) with near-field (ISO 14443), up to approximately 10 meters (33 feet) with far-field (ISO 18000-6) and can reach up to 183 meters (600 feet) when combined with a phased array. Basically, the reading and writing depends on the chosen radio frequency and the antenna design/size. The antenna used for an RFID tag is affected by the intended application and the frequency of operation.

Usually this source is provided by an RFID reader. According to embodiments of the present invention, the radio frequency device is powered by the energy of the mobile communication device; once activated, the radio frequency device will start emitting its ID (identification information).

In a preferred embodiment of the present invention, the (standard) mobile communication device 110 is a GSM telephone. There are fourteen bands defined in ETSI's 3GPP standard "TS45.005". However, the most used in EMEA are the 900 and 1800 MHZ and in America, the 850 and 1900 MHz bands. The GSM phones have an emission power of 2 W in 900 MHz and 1 W in 1800 MHz in Europe. It is therefore possible to define a radio frequency device (a RFID tag) that can be powered by a GSM phone when the telephone is emitting and the distance between the tag and the telephone is in the range of few meters (generally less that 10 m). Ultra High Frequency or UHF is 300 MHz-3 GHz. UHFID and microwave passive tags are usually radioactively-coupled to the reader antenna and can employ conventional dipole-like antennas. Only one metal layer is required, which reduces the cost of manufacturing. Dipole antennas, however, are a poor match to the high and slightly capacitive input impedance of a typical integrated circuit. Folded dipoles, or short loops acting as inductive matching structures, are often employed to improve power delivery to the IC. Half-wave dipoles (16 cm at 900 MHz) are too big for many applications; for example, tags embedded in labels must be less than 10 cm (4 inches) in extent. UHF radio frequency devices in general use ¼ wavelength antenna (about 8 cm), with specific form factors to optimize the size of the antenna and sensitivity considerations. A typical radio frequency device to be used according to embodiments of the present invention is illustrated on FIG. 4. To reduce the length of the antenna, antennas can be bent or meandered, and capacitive tip-loading or bowtie-like broadband structures are also used. Compact antennas usually have gains of less than that of a dipole—that is, less than 2 dBi—and can be regarded as isotropic in the plane perpendicular to their axis. Dipoles couple to radiation polarized along their axes, so the visibility of a tag with a simple dipole-like antenna is orientation-dependent. Tags with two orthogonal or nearly-orthogonal antennas, often known as dual-dipole tags, are much less dependent on orientation and polarization of the reader antenna, but are larger and more expensive than single-dipole tags. Patch antennas are used to provide service in close proximity to metal surfaces, but a structure with good bandwidth is 3-6 mm thick, and the need to provide a ground layer and ground connection increases cost relative to simpler single-layer structures. HFID and UHFID tag antennas are usually fabricated from copper or aluminium. Conductive inks have been used in tag antennas but have encountered problems with IC adhesion and environmental stability.

Embodiments of the present invention use the following values:

| System | Emission Frequency (MHz) |
| --- | --- |
| GSM 1800 | 1805-1880 |
| UMTS | 2110-2170 |
| GSM 900 | 925-960 |

The maximum power (at the antenna) is 2 Watts with an average value during communication mode of 0.25 Watt. In standby mode, the average power at a GSM antenna is 100 milliWatts.

| ISO Standard For UHF RFID | European (ETSI) Standard | Standard for north America | Standard for SW Asia |
| --- | --- | --- | --- |
| ISO 18000-6 UHF (860-960 MHz) | 865-868 MHz (2 W ERP - LBT) | 902-928 MHz (4 W EIRP) | 902-928 MHz (Japan 952-954 MHz) |

The mobile communication device 110 is a modified communication device. In a preferred embodiment of the present invention, it is a specific telephone set equipped with a compatible "listener" that is always listening for GSM tag IDs. The device 110 is shown in details in FIG. 3.

Figure 2:
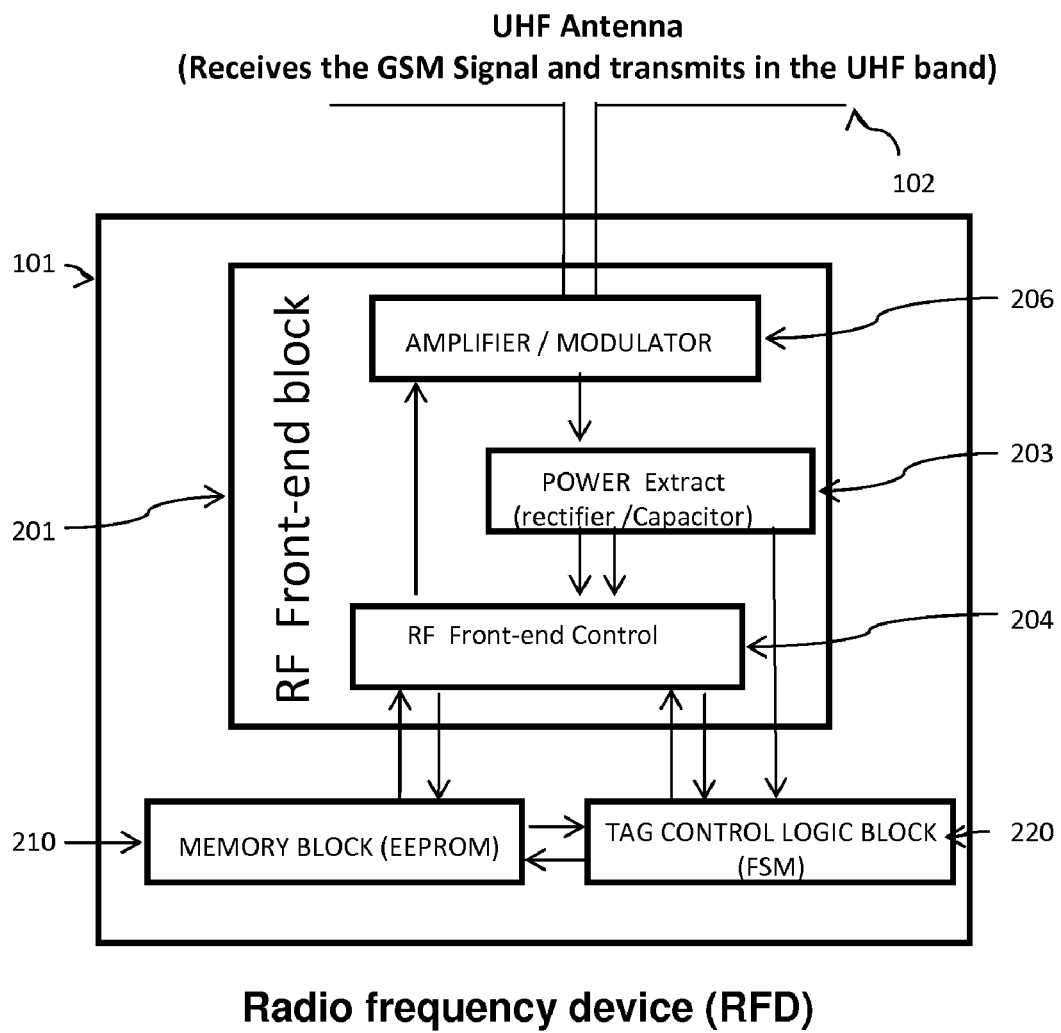
FIG. 2 shows the structure of the radio frequency device according to embodiments of the present invention.

FIG. 2 shows the structure of the radio frequency device according to embodiments of the present invention.

In a preferred embodiment, the considered device is powered by GSM energy but it does not decode the GSM signals and protocol or respond using the GSM protocol. Other bands, i.e., other than the GSM, can be used (bands in UHF such as UMTS, etc).

The radio frequency device includes a Radio Frequency front-end block 201, a tag control logic 220 which is a Finite State Machine, in charge of driving the tag behavior, and a Memory Block 210 that is a EEPROM keeping the Unique ID of the tag and possibly additional information which can be related to the type of equipment the tag is attached to, or/and to the identity of the owner of the equipment, etc). The RF Front-end block 201 is similar to what we can find in a classical UHF passive RFID tag. It includes an Antenna 102 accorded to the GSM band frequencies, a Modulator Block in charge of emitting the ID of the tag, a Power Extract Block 203, in charge of extracting the energy received by the antenna from the GSM telephones, and storing it in a capacitor for the purpose of feeding the various elements of the tag, and a RF Front-end control block, in charge of driving the RF Front-end 201 and Interfacing with the other elements of the tag.

The main differences with a classical RFID UHF tag are as follows:

a) The RF front-end block 201 is quite similar to the one existing in a standard UHF tag; the main difference is that its elements are designed to work in the GSM frequency bands. The most commonly used in Europe is GSM 900 at 925-960 MHz; however, GSM 1800 (1805-1880 MHz) and UMTS (2110-2170 MHz) can also be accommodated. The maximum permitted emitted power of a GSM telephone set is 2 W, and the mean value while in use is ¼ W. These characteristics are to be compared to the ones of the classical RFID UHF systems (E.G. ISO 18000 at 868 MHz 2 W ERP). The RF front end control is also adapted to be able to drive the tag ID emission.

b) The tag control logic block 220 is the finite state machine that drives the behavior of the tag, which is totally different from a classical RFID tag. A finite state machine (FSM) or finite state automaton or simply a state machine, is a model of behavior composed of a finite number of states, transitions between those states, and actions. A finite state machine is an abstract model of a machine with a primitive internal memory. In a digital circuit, an FSM may be built using a programmable logic device, a programmable logic controller, logic gates and flip flops or relays. More specifically, a hardware implementation requires a register to store state variables, a block of combinational logic which determines the state transition, and a second block of combinational logic that determines the output of an FSM. One of the classic hardware implementations is the Richard's Controller.

With respect to the operation, as soon as one or several GSM phones are operating in the vicinity, the tag antenna 102 receives the GSM signals. The power extractor 203 extracts the electrical energy from this signal and stores it in a capacitor to feed all the tag IC elements. The considered device receives and stores the energy emitted by the mobile communication device. The tag control logic 220 becomes active. It reads the content of the memory 210 (which contains, at minimum, the ID, identifying the object), and directs the RF front-end controller 204 to transmit this info. In turn, the RF front-end controller passes the information to the modulator which starts transmitting, cyclically, the information through the tag antenna. This operation duration as well as the frequency of emission cycle is under the control of the tag control logic 220, and as long as GSM telephones are operating in the vicinity. In further embodiments of the present invention, the control logic 220 can be enhanced (for example, regarding the duration and frequency of emission of IDs for certain types of goods discussed below).

The ID format can be compatible with the "Electronic Product Code" defined by EPCglobal organization, for RFID tags, that is, a field of 96 or 128 bits. Other existing standards can be used. An example of EPC code as defined by EPC global organization includes a "Header Code" (the first component of the EPC that tells how to parse the bits—i.e., decode the rest—of the EPC number), an "EPC Manager Number" (the second component of the EPC that describes which company or organization has authority over a group of products, typically the object manufacturer), an "Object Class" (the third component of the EPC that describes a category of things) and a "Serial Number" (the fourth component of the EPC that is critical to the reading and numeration of tags. How an individual company chooses to assign serial numbers—i.e. individual instances of the Object Class that precedes it—is up to the company). A specific value of the header code could be defined to identify tags according to embodiments of the present invention.

Regarding the tag ID transmission, to be able to use the tag's RF front-end (including the antenna) for transmitting the tag ID, the UHF band will be used. The UHF RFID tag's radio data encoding will also be used by the tag to transmit its ID. Specific telephone sets are equipped with a compatible "listener" that is always listening for GSM tag IDs. There are no protocolar exchanges between the telephone sets and the tag: when powered, the tag is always emitting and the telephone set is always listening.

The radio frequency device includes: an antenna adapted to UHF frequency bands; energy storage means adapted to charge with energy captured through the antenna; information storage means adapted to store information; transmission means adapted to transmit the information using energy from the energy storage means.

The powering of the radio frequency device can be performed in "one shot" (with a given required quantity of energy) or it can be performed in "cumulative" (several communication devices can pass nearby the radio frequency device, each powering the radio frequency device and raising its energy resources). Once the energy means are ready (for example, the capacitor is full), the radio frequency device "regurgitates" or releases its ID information (in the environment, i.e. without being in communication with any device). Energy thresholds can thus be implemented (different IDs, depending on the energy being captured). In other words, a radio frequency device is disclosed, which is adapted to emit the information when the energy stored in the energy means equals a predetermined level or quantity of energy. In further embodiments of the present invention, the radio frequency device includes a logical means adapted to control the transmission of the information at predetermined intervals.

Figure 3:
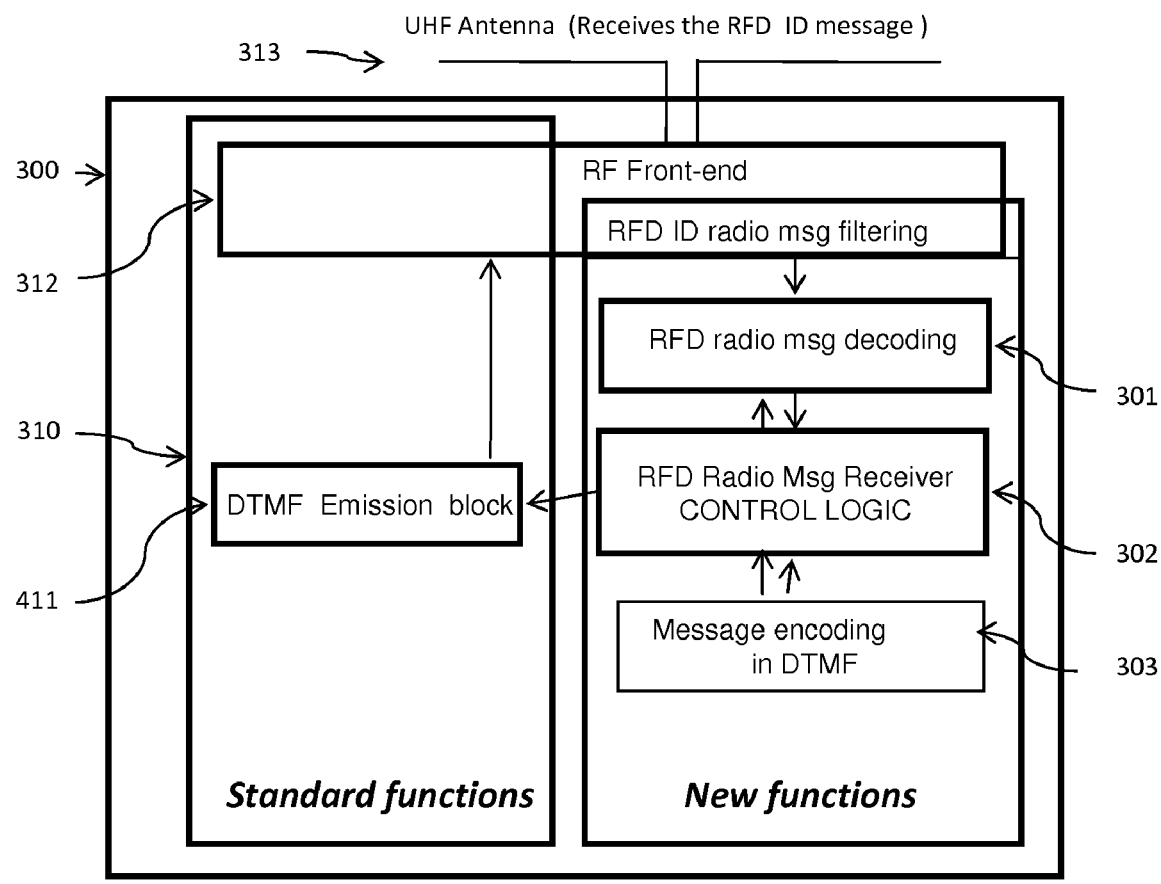
FIG. 3 shows the modified mobile communication device according to embodiments of the present invention.

FIG. 3 shows the modifications to the mobile communication device according to embodiments of the present invention. The figure illustrates new functions in the mobile communication device. According to embodiments of the present invention, the mobile communication device 105 requires some modifications in order to become a sensor in the present invention (for example it includes a receiver).

In the proposed example, in the figure, the considered mobile communication device is a mobile phone. The figure shows standard functions and additional functions. Standard functions include a DTMF Emission block 411 for example. Additional new functions include: a RF front-end 312 with a GSM tag ID radio message filtering interacting with a GSM tag radio message receiver control logic 302 interacting with a message DTMF encoding block 303 and the DTMF Emission block 411. The UHF antenna 313 still receives the GSM tagID message.

It requires a means for receiving, decoding and storing the signal emitted by the radio frequency device. Optionally, it can include an embedding means for communicating the obtained information (received from radio frequency devices) to other devices (normal GSM communication, Bluetooth, infrared, etc). It also includes an encoding means (for example DTMF encoding means, inserting means). In a preferred embodiment of the present invention, the modified GSM phone, if active, receives and decodes the ID information from the radio frequency device (GSM tag), it encodes it in DTMF and sends it on the radio channel if one is established. If no radio channel is established, within a predefined period of time, it discards the message.

These new means or capabilities can be obtained by firmware or software modifications (mobile phones can then be easily updated by operators since most of the time these capabilities are available by default on the vast majority of mobile phone models). For example, the detection can occur by a simple radio emission or using any low consumption protocol like Zigbee or Bluetooth technologies. Mobile phones can thus be easily updated by operators. It is indeed suggested to use radio modulation (which is natively implemented in UHF tags) for the sake of ease. The modification is then firmware or hardware, depending on the technology of the mobile communication device (purely numeric or a combination i.e. RF front-end hardware and the rest firmware.

A (modified) mobile communication device does not integrate an RFID reader, which requires regular requests sent in the environment and following requires specific energy.

In a preferred embodiment of the present invention, the information is extracted one-way (from the radio frequency device to the mobile communication device). In another embodiment of the present invention, the information is exchanged two-ways (the mobile communication device updating the radio frequency device for example, activating it or else); but this solution requires an exchange protocol (corresponding to the situation of an RFID reader), of which constraints are avoided in the preferred embodiment.

In a preferred embodiment of the present invention, the communication is one-way (from the radio frequency device to the mobile communication device). In other embodiments of the present invention, the communication can be two-ways: to read radio frequency device data, the mobile communication device can use a tree-walking simulation algorithm, resolving possible collisions and processing responses one by one. Besides this, radio frequency device may be promiscuous, attending all requests alike, or secure, i.e. requiring authentication and control of typical password management and secure key distribution issues. The radio frequency device may also be prepared to be activated or deactivated in response to specific mobile communication device commands.

According to the embodiments of the present invention, the mobile communication device has been modified to be able to receive the message emitted by the radio frequency device. The mobile communication device thus includes a simple radio component which listens to the frequency and pre-defined protocol.

Figure 4:
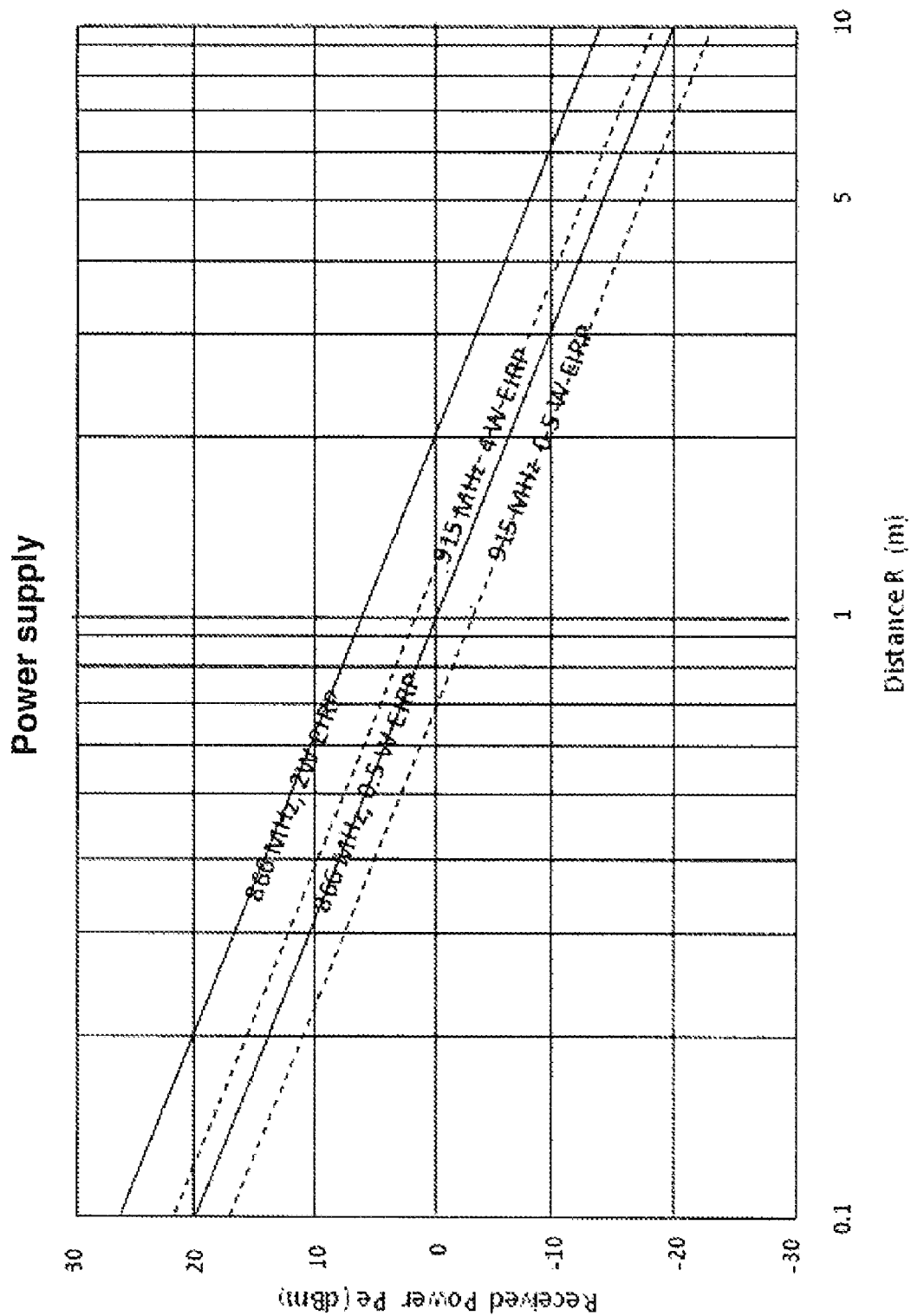
FIG. 4 shows the power supply of the radio frequency device according to embodiments of the present invention.

FIG. 4 shows the power supply of radio frequency devices according to embodiments of the present invention. The graph shows the theoretical maximum power Pe, received by a tag as a function of the distance R of the source, and for various powers and frequency of the source. Real data is provided in the description of FIG. 5.

Figure 5:
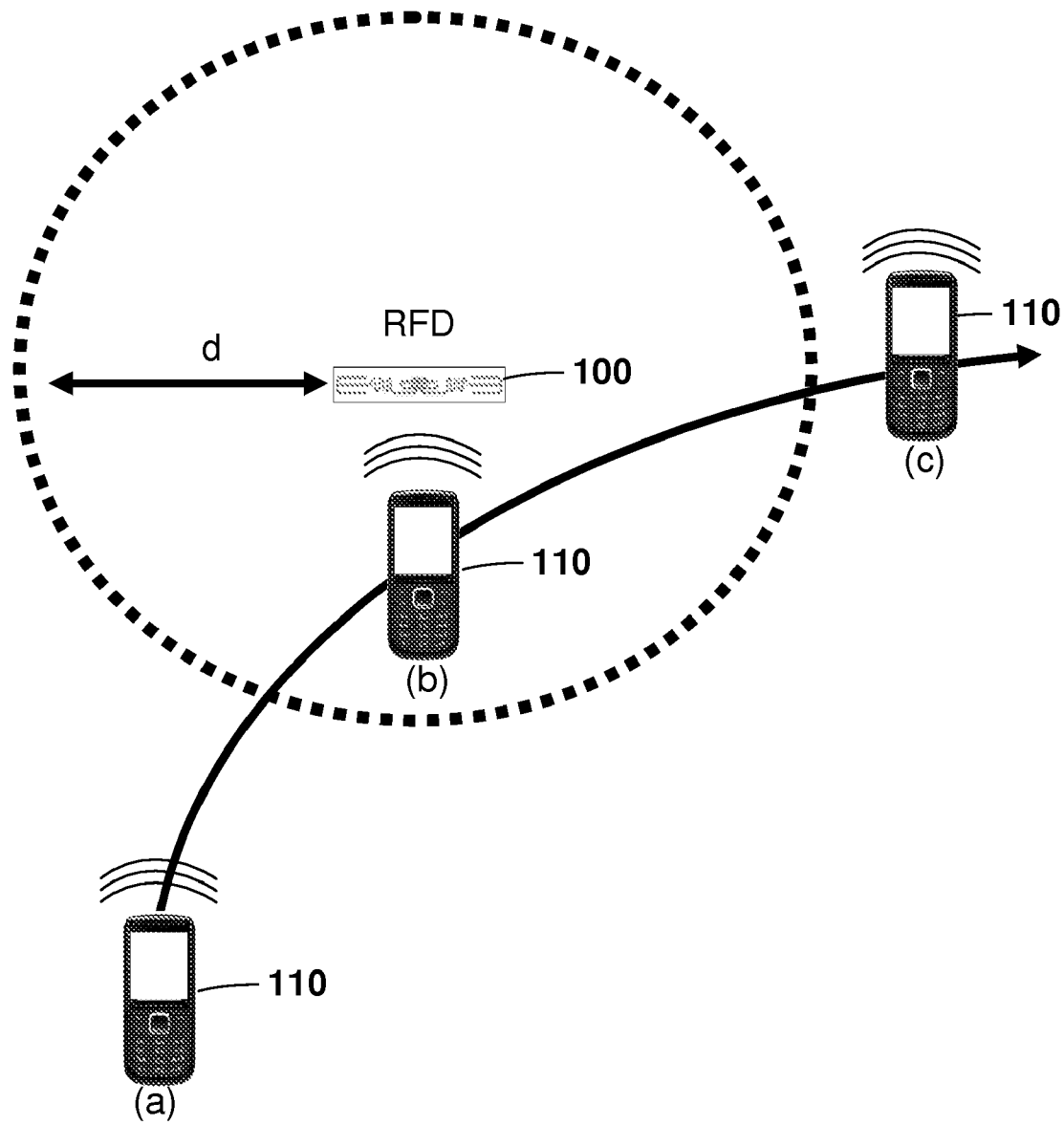
FIG. 5 shows the radio frequency device powered by a standard or modified mobile communication device according to embodiments of the present invention.

FIG. 5 shows the radio frequency device powered by a standard or modified mobile communication device according to embodiments of the present invention. The figure shows a (standard) mobile communication device coming in the vicinity of the radio frequency device.

The figure includes a mobile communication device 110 and a radio frequency device 100. In position (a), exceeding a range of d meters, the radio frequency device is not powered by the mobile communication device. In position (b), within a range of d meters, the radio frequency device is powered by the mobile communication device. In position (c), the radio frequency device is no longer powered by the mobile communication device. The displacement of the mobile communication device can correspond, for example, to a mobile communication device holder passing nearby the radio frequency device. Even if staying for a short moment in the proximity of the radio frequency device, the presence of the mobile communication device is sufficient to power the radio frequency device and provoke the extraction of information that will be described on FIGS. 6 and 7.

In standby mode (the mobile communication device is powered on but is not in active or operative communication), the level of energy is too low to power the radio frequency device, unless both devices are close to each other (within a 1 meter range). In a communication mode (active mobile phone, the user is in a call), the energy is sufficient to power the radio frequency device (within a 2-3 meters range) and have the device emitting its ID during the communication of the mobile communication device.

Typical values of the distance d are of the order of a few meters (maximum 8 to 10 meters but typically 4 to 5 meters).

According to the embodiments of the present invention, the considered tag exploits or takes advantage of the ambient (and unused) energy.

Figure 6:
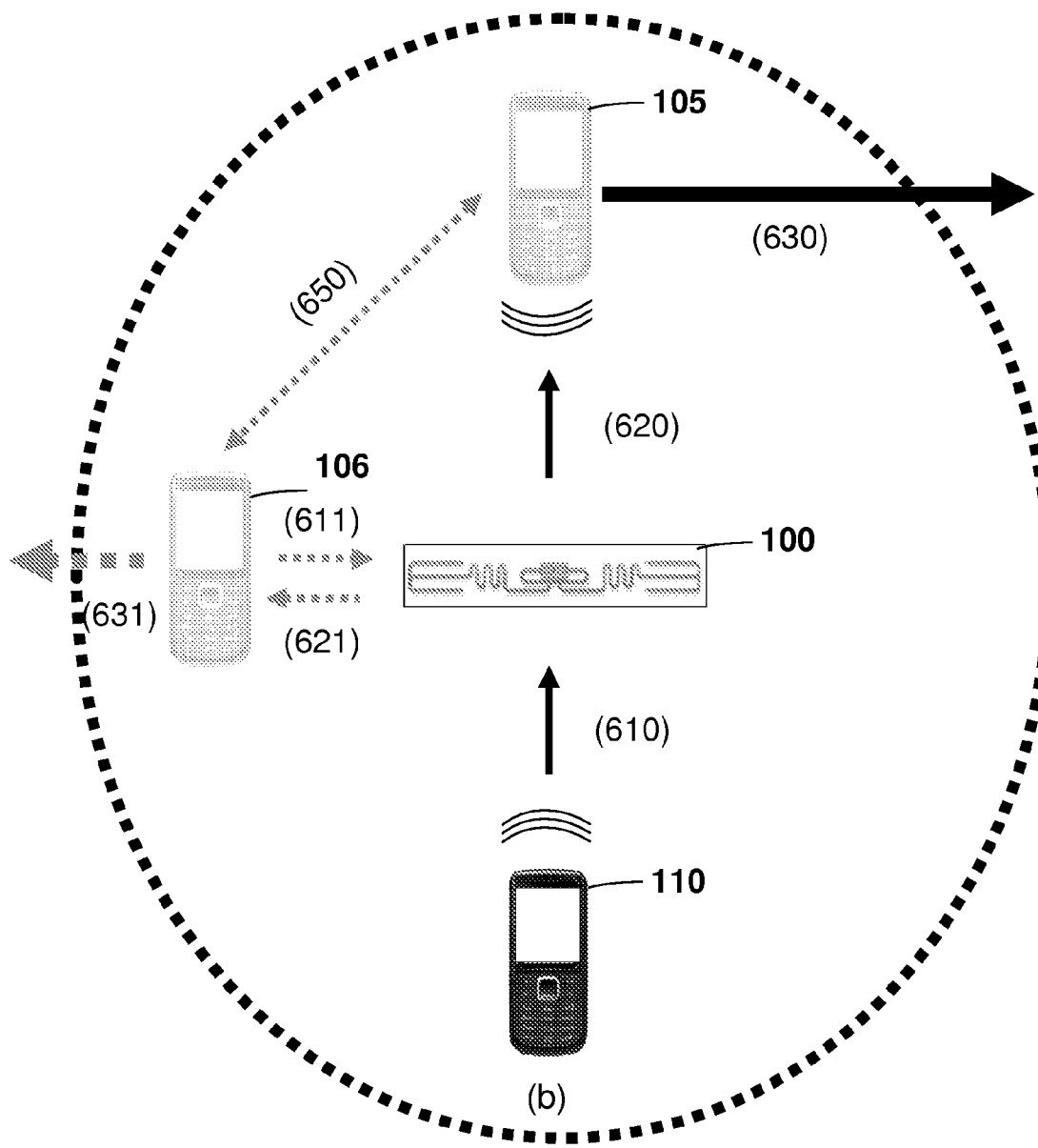
FIG. 6 details the interaction between a radio frequency device, a modified mobile communication device and a standard mobile communication device according to embodiments of the present invention.

FIG. 6 details the interaction between a radio frequency device, a modified mobile communication device and a standard mobile communication device according to embodiments of the present invention. The figure shows a radio frequency device 100, two (modified) mobile communication devices 105 and 106, and a (standard) mobile communication device 110. The mobile communication devices 105 and 106 are devices modified according to some embodiments of the present invention.

The mobile communication device 110 is a standard communication device, which has not been modified according to the embodiments of the present invention. The mobile communication device 110 is in position (b) of FIG. 5; it is close to the radio frequency device 100 (within the d meters distance range). At step 610, the mobile communication device 110 electromagnetic emission powers the radio frequency device. Subsequently, when a modified mobile communication device 105 passes nearby the radio frequency device, it captures the ID information at step 620 (in response to induction forces, the radio frequency responds by emitting its pre-determined ID information).

Modified devices can receive identification information emitted by radio frequency devices. Standard (not modified) devices can only power radio frequency devices. Immediately or later (it keeps the information only for a predefined period of time; in some embodiments of the present invention, if no connection with the network occurs within this period of time, the message is discarded since the message has no value as the telephone may have moved to another place while the reception of the ID information has not been time-stamped), the mobile communication device 105 uploads the ID information in the network at step 630.

As shown on FIG. 6, the standard mobile communication device 110 only powers the radio frequency device (step 610); it does not have the capability of receiving the identification information emitted by the radio frequency device being powered.

The figure also shows a modified mobile communication device 106 in another configuration: passing nearby the radio frequency device it powers the device (step 611), receives the ID information (step 621) and uploads the information in the network at step 631. Compared to the previous situation of the device 105, the device 106 in the latter situation both powers and uploads the captured information (in the first described situation the device 105 did not power the radio frequency device; device 110 did).

In short, embodiments of the present invention dissociate the energy alimentation and the uploading of the information. Interaction 650 illustrates the communication (UWB, Bluetooth, etc) that can occur between communication devices. A communication device including a light specific Bluetooth application would understand this ID information and be able to exchange this information with the modified communication devices according to embodiments of the present invention. Generally speaking, in a preferred embodiment of the present invention, the ecosystem can be composed of standard mobile phones (unmodified), modified mobile phones (capable of receiving the ID) and modified mobile phones (capable of exchanging the ID via Bluetooth); all of these devices powering the radio frequency devices.

The device 105 can store the ID information which will be uploaded at a later stage by the device 106 (both devices interacting via Bluetooth for example). Combinations of exchanges between modified and standard mobile communication devices can occur; for example, the ID information (and associated time information if available) received from a first device can be transmitted to a second communication device which at a given moment enters in interaction with another mobile communication device, which may in turn uploads the ID information, etc. The above communication of the interaction can be achieved by Bluetooth for example; a possible scenario is that a first device captures the information of a tag apposed on a luggage at the airport in the morning and that a second device retrieves the information from device in the evening and uploads it. Some communication devices can be mobile devices (as shown on the drawings) or alternatively, they can be fixed devices (not shown);

Once powered, the radio frequency device starts transmitting its ID (and possibly other information), using predefined frequency and protocol. For instance zigbee or any other lightweight protocol can be used. The mobile phone is provided with a simplified receiver (it does not use the standard protocol between an RFID reader and a corresponding RFID tag).

The mobile communication device does not intervene. It powers the radio frequency device, being in operative communication mode (the holder is calling somebody) or in standby mode (not in a call). It is one of the valuable advantages of the embodiments of the present invention.

Figure 7:
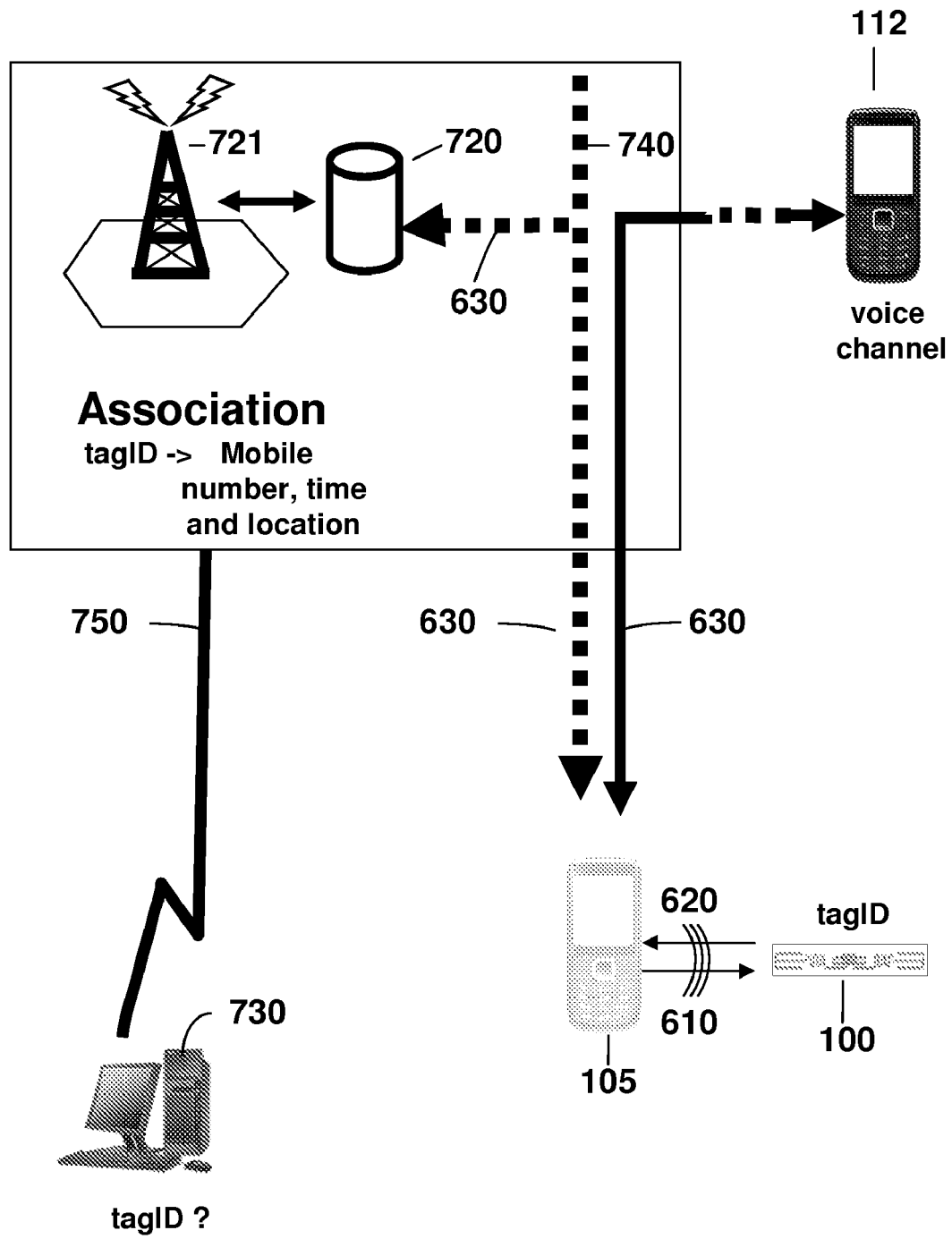
FIG. 7 details the workflow of the embodiments of the present invention and the cellular network operator level according to embodiments of the present invention.

FIG. 7 details the workflow of the embodiments of the present invention and the cellular network operator level according to embodiments of the present invention. It illustrates the determination of the location of the radio frequency device. FIG. 7 shows a radio frequency device 100, two mobile communication devices 105 and 112, a database 720, a base station of a cellular network 721 and a computer 730.

At step 610, the mobile communication device being in the vicinity of the radio frequency device powers the radio frequency device 100; at step 620, the radio frequency device 100 emits its ID information; the ID information is received by the mobile communication device 105; the ID information is then time-stamped (date, hour, minutes, second); at this step a device has captured the target information; several events will happen and this target information will be reused; the resulting information (ID plus geographic data) is encoded and merged using the DTMF (or any other technique multi-frequency in-band signalling technique) by the device 105. If a voice communication is not used, an alternative embodiment of the present invention is that the telephone sends a SMS or any message to a predefined central point that can communicate with the database 720.

The ID information can be associated with GPS coordinates (if available) in the mobile communication device 105 and transmitted accordingly.

Further embodiments of the present invention associate some other data to the ID information; for example, it can be associated with time data (such as a "time-to-live" of the identification information, which is handled by the first and/or the second device) and other data (such as the maximal or the minimal number of uploads of the identification information). This information will not be handled by the tag itself but tanks to a centralized database in the network.

At step 630, the resulting information is transmitted during a communication established with another (modified or not) mobile communication device 112 (data is inserted in a standard voice communication). In a preferred embodiment of the present invention, the ID information is sent without using a dedicated channel such as a SMS/MMS or any data channel. The use of an opened voice/audio communication is preferred. The device 105 waits for the initiating by the user of the device 105 of a communication to insert the obtained identification information in the communication. This way, the operation is transparent for the user of the device 105 and the energy consumption is optimized. In a particular embodiment of the present invention, the device 105 is able to code the ID information in DTMF and pass it "in band" on the channel carrying the phone conversation.

At step 630, a third party (such as the network operator of the mobile communication device 105 or 112) extracts the resulting information. With the extracted timestamp data, geographic information about the location of the mobile communication device is retrieved, and in the end, the location of the radio frequency device can be established. For example, GSM network operators manage databases 720 containing the date, duration and location of call emitters and receivers; the information related to the base station 721 provides indirect location information.

Several localization techniques can be used. In GSM geolocalization, the "Cell-Id" technique is not very accurate (100-300 m in town). The "EOTD" technique involves computing the delay of communication between the mobile communication device and the base station but the accuracy is much better; the "triangulation" technique offers very good accuracy (tens of meters). A plurality of base stations can also be associated with one or more lists of identification information corresponding to the lists of tracked devices. The determination of location of devices can for example be derived from the knowledge of overlaps of cells in the cellular network.

In the proposed example, the GSM network provider captures or intercepts the DTMF messages and makes the association between the ID information of the radio frequency device and the mobile communication device, and in the end with the location of the mobile communication device at the time of reception of the ID information. This corresponds approximately to the location of the radio frequency device (within the range of d meters).

At step 740, the communication between mobile communication device 105 and 112 still contains geographic and time stamped data and can be derived for any other uses (by other third parties or for public data, statistical data, alert system, police systems, traffic jams probabilistic determination when a high density of mobiles phones is involved, etc.)

At step 750, the computer 730 can perform queries: the IDs are made available such that a user can make a query about an object tagged with a given ID, to localize the object. Services such as displays on maps on web pages (in real-time or not), alerts via SMS or MMS or emails or voicemails are some of the many services that can be further proposed.

In a preferred embodiment of the present invention, DTMF encoding over an established voice channel is used because switching centres are able to decode the DTML codes very easily and this does not require any additional modifications or costs at operators' level. Dual-tone multi-frequency (DTMF) signalling is an in-band signalling technique. It is used for telephone signalling over the line in the voice-frequency band to the call switching center. DTMF can be decoded using the Goertzel algorithm. MF was used for trunk signalling, and is a precursor of modern DTMF "touch" tones now used for subscriber signalling.

The user of the mobile communication device does not intervene; all operations are transparent for the user.

There are many examples of services corresponding to certain embodiments of the present invention.

Figure 8:
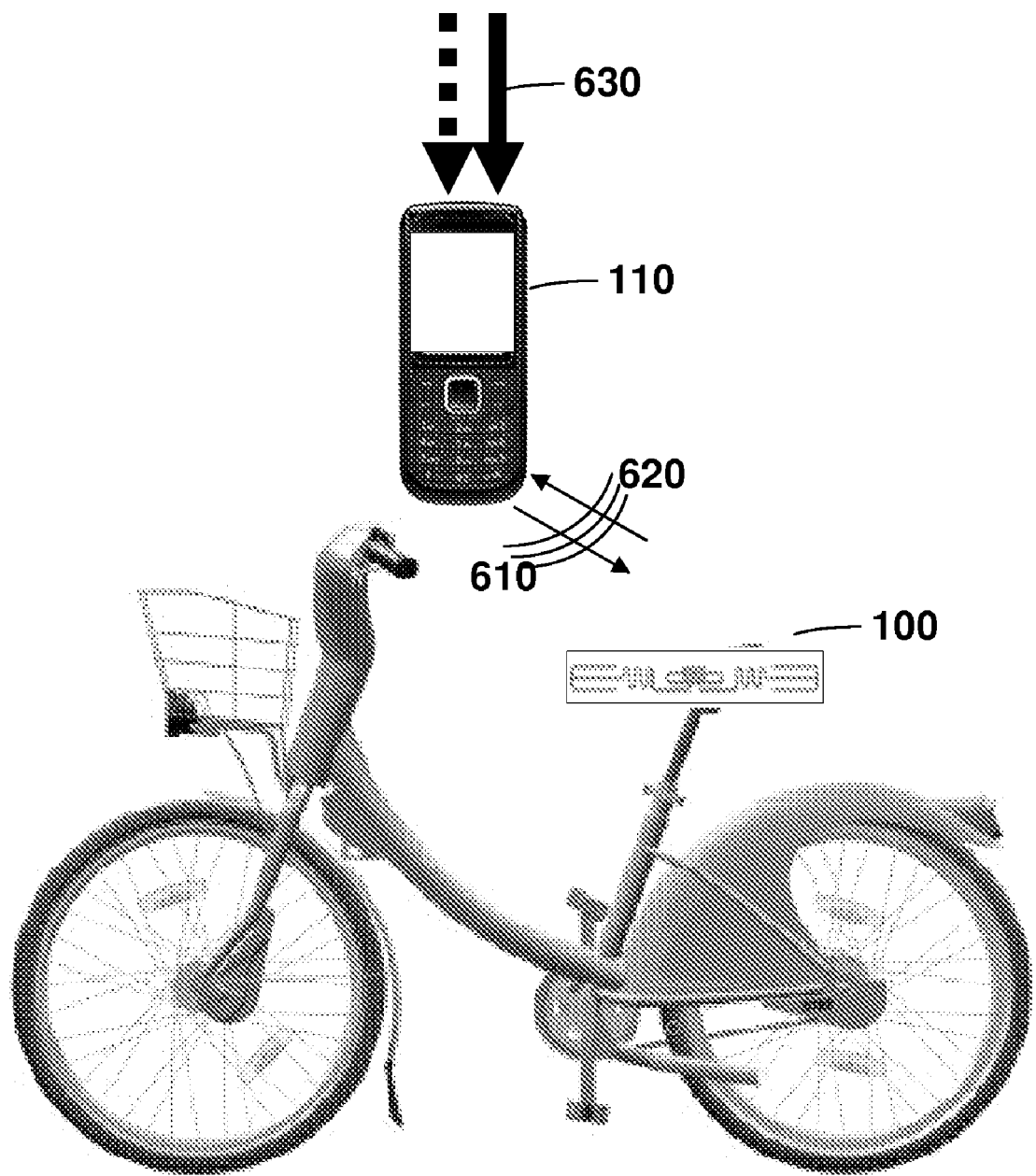
FIG. 8 provides an example of an application of embodiments of the present invention to the prevention of the loss or theft of bicycles.

FIG. 8 provides an example of an application according to the embodiments of the present invention for the prevention of bicycle theft. The figure shows a radio frequency device apposed on a bicycle and a mobile communication device. According to embodiments of the present invention, the method and system is used for tracking bicycles.

If a given bicycle has such a radio frequency device according to embodiments of the present invention, a stolen bicycle can emit a radio signal which includes the bicycle's ID. The radio signal is then captured by (modified) mobile phones located in the vicinity. These phones upload the information to the network operator. Using the geolocalization of the phone, it is possible to determine the position of the bicycle and then retrieve it.

It is also possible to add a variation with respect to the powering of the radio frequency device. As mentioned above, the radio frequency has been described as being a passive radio frequency device; in the bicycle example, the radio frequency device can be an active device. For example, a dynamo coupled to the bicycle can power the radio frequency device.

According to other variations, it is also possible to determine if the use is fraudulent or not, by comparing (in the mobile communication device or at the network operator level) the ID of the radio frequency device attached to the bicycle and the ID of the cycler. If both ID matches, nothing happens. If there is no concordance, in spite of a refusal to unblock the anti-theft system, the radio frequency device starts emitting its ID; which ID is received by a mobile phone (the thief's one or another one in the vicinity, a modified model passing nearby).

Other components may be easily added: for example, a generator may power electronic circuits which in turn HF powers the bike owner's radio frequency device. In turn, an electronic circuit would capture the owner's ID and if different from the owner's, the electronic circuit would start emitting.

The bicycle is equipped with a system that has an electrical generator activated by the bicycle movement. The energy produced by electrical generator (100) is used to provide power to (1) an first electronic circuit able to listen radio signals (IDs) emitted by RFID tags, and compare received IDs with a predefined ID; (2) an second electronic circuit able to emit a radio signal carrying the bike's ID (3) an third electronic circuit that provide HF power to a second radio frequency device carried by the bicycle owner.

The bicycle owner carries the second radio frequency device. When the bicycle is in movement, the first electronic circuit is powered and start listening to any signal coming from the rider, and the third electronic circuit is powered and starts HF powering the second radio frequency device carried by the bike owner, so that the second radio frequency device starts emitting the owner's ID.

The first electronic circuit receives the owner ID signal and compares it with a preconfigured ID; if it gets a match then nothing happens since this is an authorized use of the bicycle; if there is no match, or if no signal is received, this indicates that the bike rider, is not the owner or is not authorized. Then the second electronic circuit starts emitting the bike's ID. With this bike's ID, the method and system described above can be implemented: the bike's ID is captured by a modified mobile phone in the vicinity, etc. In other words, the bicycle automatically can signal a non-authorized use and that signal can be used to track the bicycle route and to possibly retrieve stolen bicycles.

GSM network operators can intercept these messages and give access to authorized public administration/authorities. The police could monitor the signals sent by stolen bicycles and intercept directly the robbers, knowing his geographical location.

Figure 9:
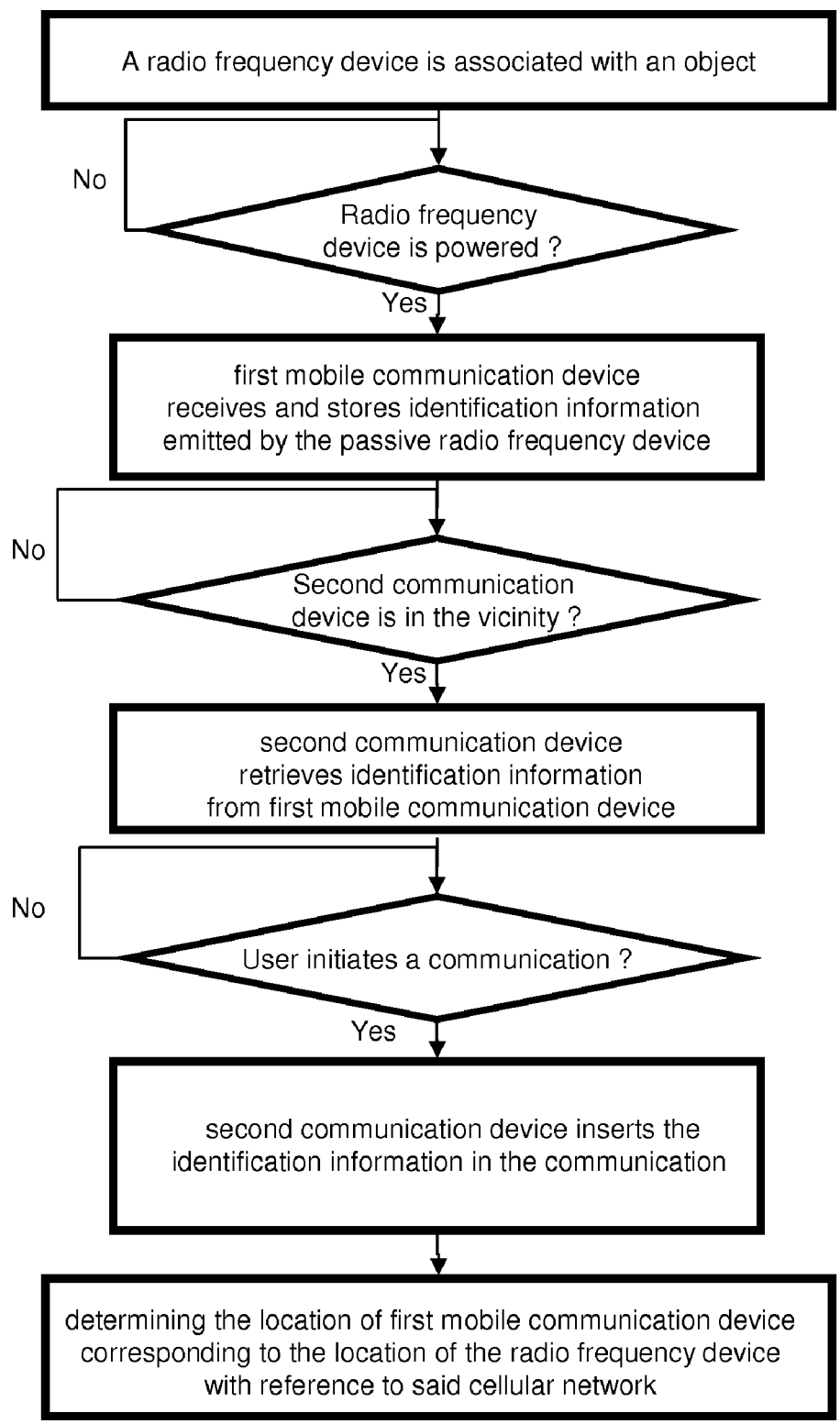
FIG. 9 provides a flowchart of the method according to embodiments of the present invention.

FIG. 9 shows a flowchart according to embodiments of the present invention.

In a first step, a first mobile communication device connected to a cellular network receives and stores the identification information emitted by the radio frequency device. In a second step, a second communication device capable of user initiated communications retrieves the identification information from the first mobile communication device. In a third step, the second communication device awaits the initiating by the user of a communication and inserts the identification information in the communication. It is later determined the location of the first mobile communication device with reference to the cellular network; the location of the first mobile communication device being associated with the location of the radio frequency device.

Intermediate generalizations and advanced features that can optionally be combined with embodiments of the present invention are now discussed.

While the systems and methods are illustrated in the drawings by use of mobile phone embodiments and applications, they are equally applicable to virtually any portable or mobile communication device, including for example, wireless laptop computers and PDAs.

Embodiments of the present invention also cover "extended capability RFID" devices which define a category of RFID that goes beyond the basic capabilities of standard RFID as merely a "license plate" or barcode replacement technology. Key attributes of extended capability RFID include the ability to read at longer distances and around challenging environments, to store large amounts of data on the tag, to integrate with sensors, and to communicate with external devices.

The embodiments of the present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc. In a high performance system, a hardware implementation of the virtualization mechanism bundled with image generation processing may prove advantageous for example.

Furthermore, the embodiments of the present invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, propagate, or transport the program for use by or in connection with the instruction execution system, apparatus, or device.

What is claimed is:

1. A computer-implemented method of handling identification information emitted by a radio frequency device, the method comprising:
   receiving and storing the identification information transmitted by a radio frequency device, wherein a first mobile communication device is connected to a cellular network and the first mobile communication device receives and stores the transmitted identification information;
   retrieving the identification information, wherein a second communication device capable of user initiated communications retrieves the identification information from the first mobile communication device and wherein the second communication device awaits an initiation by a user of a communication;

inserting the identification information in the communication;

wherein the radio frequency device wirelessly receives energy from a third mobile communication device different from the first mobile communication device and the second mobile communication device, and wherein the third mobile communication device is not capable of receiving, storing, and retrieving the identification information transmitted by the radio frequency device; and transmitting energy to the radio frequency device via electromagnetic radiation emitted by the third mobile communication device, and, in response to the third mobile communication device transmitting the energy, the radio frequency device transmits the identification information.

2. The method of claim 1, further comprising determining a location of the first mobile communication device with reference to the cellular network, wherein the location of the first mobile communication device is associated with a location of the radio frequency device.

3. The method of claim 2, wherein the determining the location of the first mobile communication device is performed with reference to location information of a base station associated with the first mobile communication device in the cellular network.

4. The method according to claim 2, wherein the determining the location of the first mobile communication device is performed with reference to time stamped data associated with the identification information emitted by the radio frequency device.

5. The method according to claim 1, wherein the inserting the identification information in the communication is performed by means of dual-tone multi-frequency signaling (DTMF) encoding.

6. The method according to claim 1, wherein the first mobile communication device or the second communication device comprises a cellular telephone or a wireless device.

7. The method according to claim 1, wherein the second communication device is a fixed device.

8. The method according to claim 1, wherein the first mobile communication device emits radiation at a first frequency, and wherein the radio frequency device is adapted to be responsive at the first frequency.

9. The method according to claim 1, further comprising providing a location of the first mobile communication device upon a query by the user.

10. The method according to claim 1, wherein the first mobile communication device and the second communication device are the same device.

11. A computer program product for handling identification information emitted by a radio frequency device, the computer program product comprising computer program instructions stored on a computer readable storage medium, wherein the instructions, when executed, will cause a computer to perform the method according to claim 1.

12. A radio frequency device for emitting identification information, the radio frequency device comprising:
an antenna adapted to operate in ultra-high frequency (UHF) frequency bands;
an energy storage device, comprising a capacitor, adapted to be charged with energy captured through the antenna;
an information storage device adapted to store information; and
a transmission device adapted to transmit the information using the energy from the energy storage device;
wherein the radio frequency device is adapted to emit the information when the energy stored in the capacitor equals a predetermined level of energy.

13. The radio frequency device of claim 12, further comprising a logical device adapted to control the transmission of the information at predetermined intervals.

14. A computer-implemented system of handling identification information emitted by a radio frequency device, the system comprising:
a first mobile communication device for receiving and storing the identification information transmitted by the radio frequency device, wherein the first mobile communication device is connected to a cellular network;
a second communication device for retrieving the identification information from the first mobile communication device, wherein the second communication device is capable of user initiated communications and wherein the second communication device awaits an initiation by a user of a communication;
an inserting device for inserting the identification information in the communication;
wherein the radio frequency device wirelessly receives energy from a third mobile communication device different from the first mobile communication device and the second mobile communication device, and wherein the third mobile communication device is not capable of receiving, storing, and retrieving the identification information transmitted by the radio frequency device; and
wherein the third mobile communication device transmits to the radio frequency device via emitted electromagnetic radiation, and, in response to the third mobile communication device transmitting the energy, the radio frequency device transmits the identification information.

* * * * *